(12) United States Patent
Chiu et al.

(10) Patent No.: US 12,153,246 B2
(45) Date of Patent: *Nov. 26, 2024

(54) LIGHT EMITTING DEVICE

(71) Applicant: Innolux Corporation, Miaoli County (TW)

(72) Inventors: Yu-Chun Chiu, Miaoli County (TW); Chia-Hao Kuo, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,652

(22) Filed: Nov. 20, 2023

(65) Prior Publication Data

US 2024/0085615 A1   Mar. 14, 2024

Related U.S. Application Data

(63) Continuation of application No. 18/299,066, filed on Apr. 12, 2023, now Pat. No. 11,867,940, which is a continuation of application No. 17/844,751, filed on Jun. 21, 2022, now Pat. No. 11,656,400.

(30) Foreign Application Priority Data

Jul. 28, 2021   (CN) .......................... 202110858430.7

(51) Int. Cl.
*F21V 8/00*   (2006.01)

(52) U.S. Cl.
CPC ......... *G02B 6/0066* (2013.01); *G02B 6/0055* (2013.01); *G02B 6/0088* (2013.01)

(58) Field of Classification Search
CPC ... G02B 6/0066; G02B 6/0055; G02B 6/0088
See application file for complete search history.

(56) References Cited

U.S. PATENT DOCUMENTS 11,867,940 B2 *   1/2024   Chiu .................... G02B 6/0066

OTHER PUBLICATIONS

Shim, WO 2007064096, Jun. 2007 (Year: 2007).*

* cited by examiner

*Primary Examiner* — Mary Ellen Bowman
(74) *Attorney, Agent, or Firm* — JCIPRNET

(57) ABSTRACT

A backlight module and an electronic device are provided. The backlight module, having a main region and a peripheral region near the main region, includes a light conversion layer, multiple light conversion patterns located in the peripheral region, and multiple light emitting units emitting a light beam. A first portion and a second portion of the light beam emitted respectively from the main region and the peripheral region both have at least one corresponding position in a CIE 1931 color space. One among the at least one corresponding position of the first portion of the light beam has corresponding coordinates (x1, y1). One among the at least one corresponding position of the second portion of the light beam has corresponding coordinates (x2, y2). The corresponding coordinates (x1, y1) and the corresponding coordinates (x2, y2) satisfy the following relation: $0 \leq |x1-x2| \leq 0.2$.

14 Claims, 16 Drawing Sheets

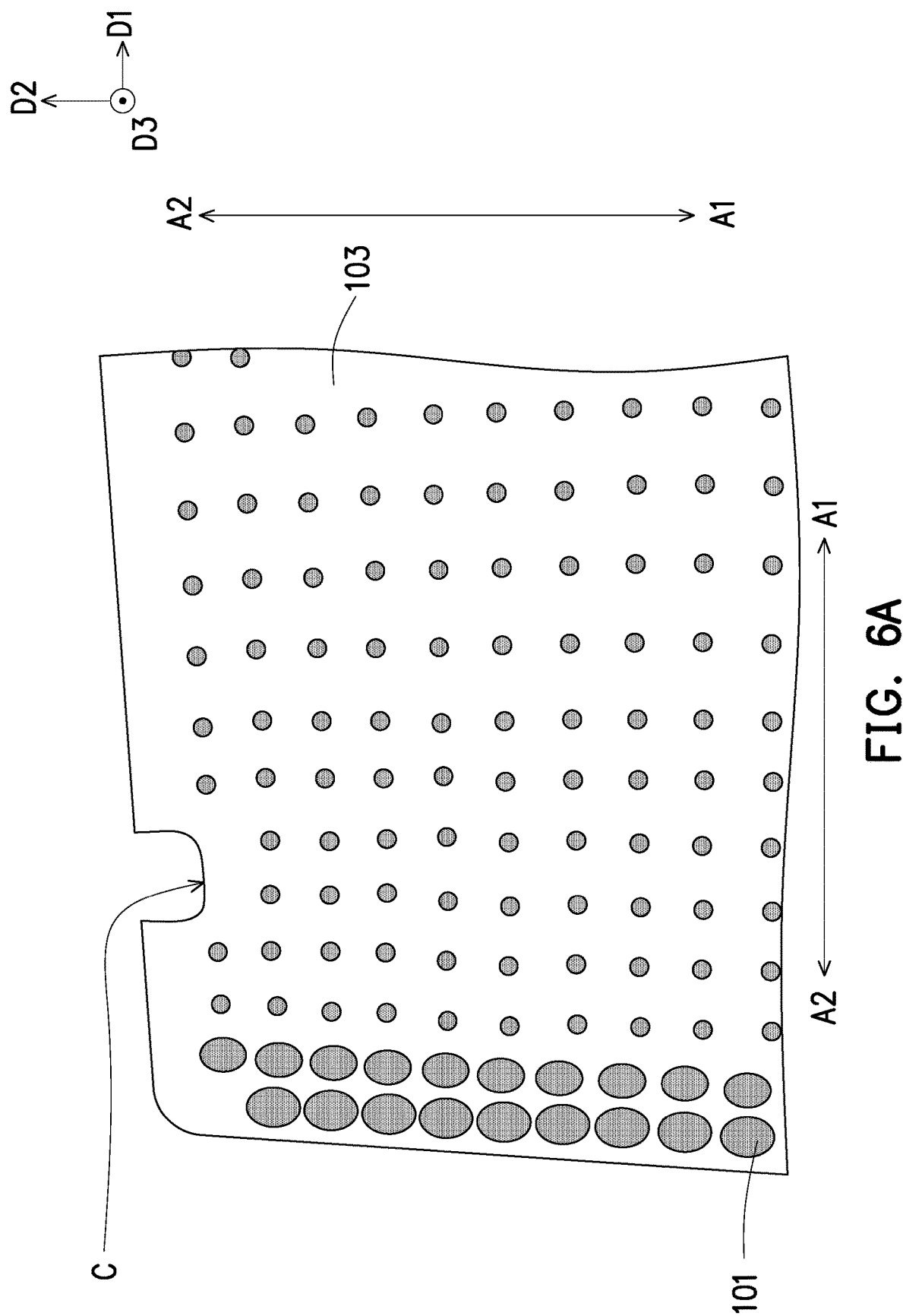

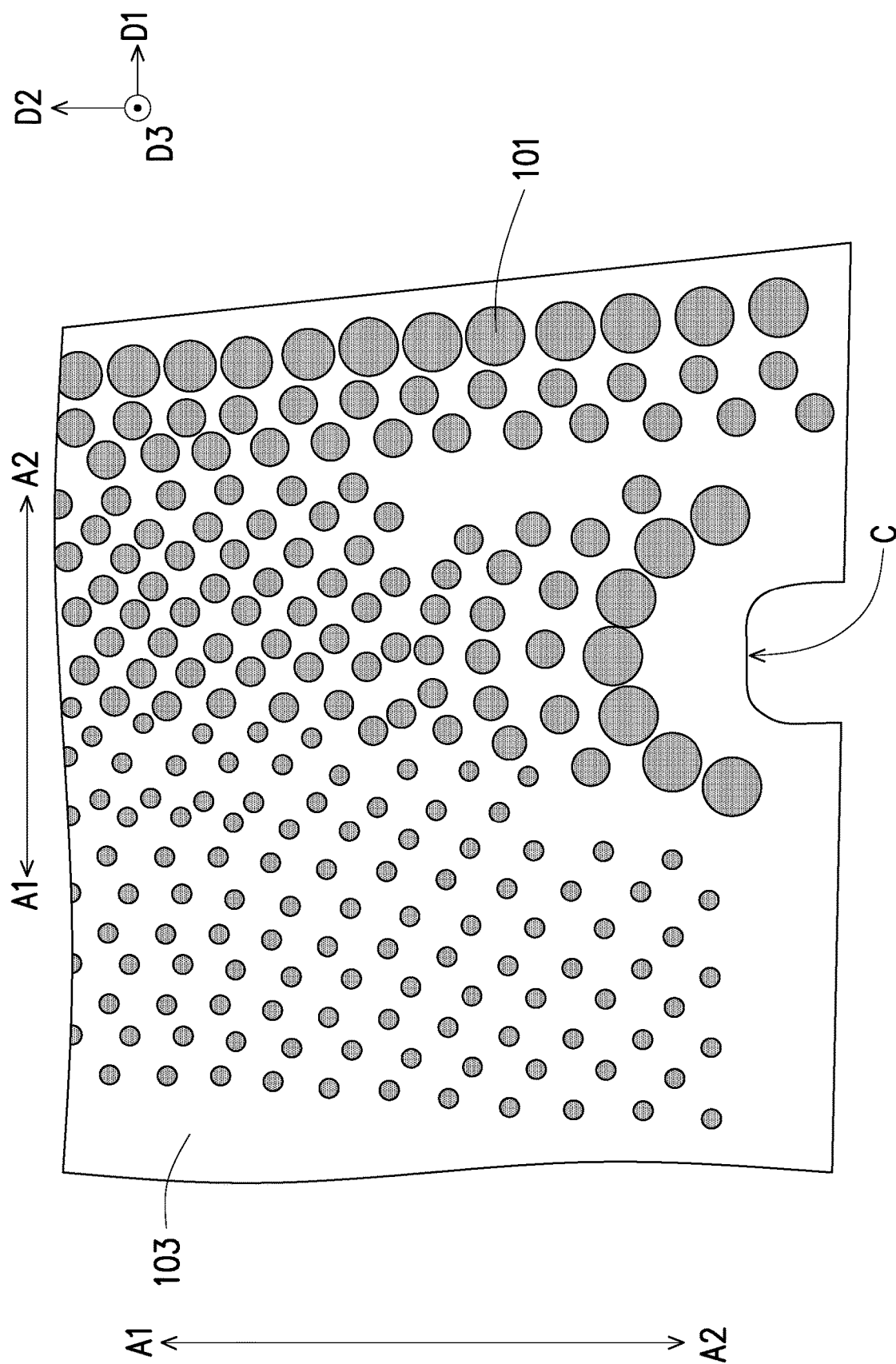

LIGHT EMITTING DEVICE

CROSS-REFERENCE TO RELATED APPLICATION

This application is a continuation application of and claims the priority benefit of U.S. application Ser. No. 18/299,066, filed on Apr. 12, 2023. The prior U.S. application Ser. No. 18/299,066 is a continuation application of and claims the priority benefit of U.S. application Ser. No. 17/844,751, filed on Jun. 21, 2022, which claims the priority benefit of China application serial no. 202110858430.7, filed on Jul. 28, 2021. The entirety of each of the above-mentioned patent applications is hereby incorporated by reference herein and made a part of this specification.

BACKGROUND

Technical Field

The disclosure relates to a module and a device, and more particularly to a backlight module and an electronic device.

Description of Related Art

A backlight module in an electronic device uses a blue light emitting unit with a light conversion layer to generate white light. With this structure, an edge region of the backlight module is prone to white light color point shift, which results in inconsistent white light performance in the center region and in the edge region of the backlight module.

SUMMARY

The disclosure provides a backlight module and an electronic device, which help address the problem of white light color point shift in an edge region of a backlight module.

According to the embodiments of the disclosure, the backlight module has a main region and a peripheral region near the main region. The backlight module includes a light conversion layer, multiple light conversion patterns, and multiple light emitting units. The light conversion patterns are located in the peripheral region. The light emitting units emit a light beam. A first portion of the light beam emitted from the main region has at least one corresponding position in a CIE 1931 color space. A second portion of the light beam emitted from the peripheral region has at least one corresponding position in the CIE 1931 color space. One among the at least one corresponding position of the first portion of the light beam has corresponding coordinates (x1, y1). One among the at least one corresponding position of the second portion of the light beam has corresponding coordinates (x2, y2). The corresponding coordinates (x1, y1) and the corresponding coordinates (x2, y2) satisfy the following relation: $0 \leq |x1-x2| \leq 0.2$.

According to the embodiments of the disclosure, the electronic device includes the backlight module and a display panel disposed on the backlight module.

Embodiments accompanied with drawings are described in detail below to make the aforementioned features and advantages of the disclosure comprehensible.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6A and FIG. 6B are the fourth partial schematic top views of different regions of the reflecting layer on which multiple light conversion patterns are disposed.

DESCRIPTION OF THE EMBODIMENTS

Figure 1:
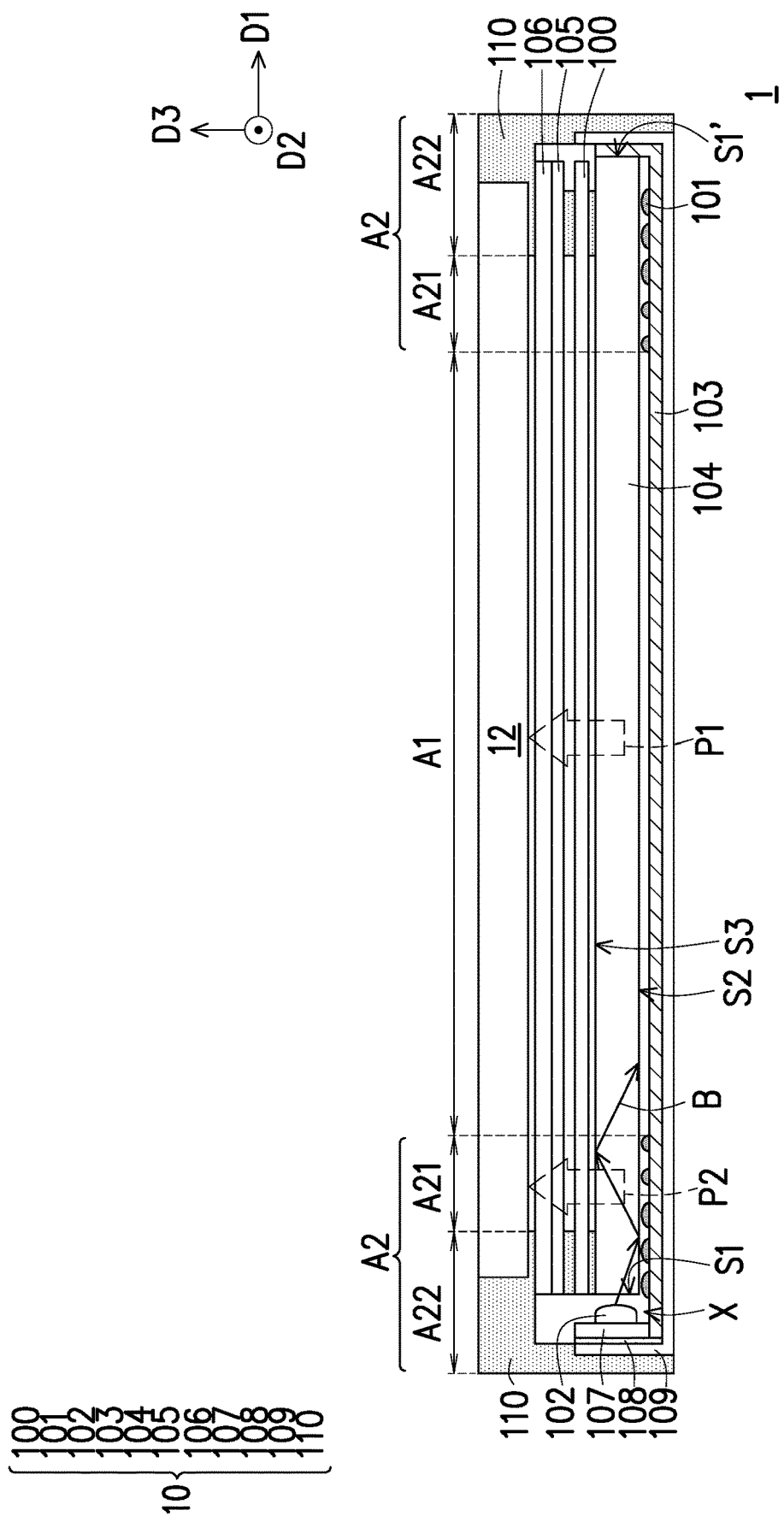
FIG. 1 is a schematic cross-sectional view of an electronic device according to an embodiment of the disclosure.

The disclosure may be understood by referring to the following detailed description in conjunction with the accompanying drawings. It should be noted that, in order to facilitate understanding and for concision of the drawings, only a part of the electronic device/display device is shown in multiple drawings in the disclosure, and certain elements in the drawings are not drawn to actual scale. In addition, the number and size of each element in the drawings are only exemplary and are not used to limit the scope of the disclosure. For example, the relative size, thickness, and location of layers, regions, or structures may be reduced or enlarged for clarity.

Certain words will be used to refer to specific elements throughout the specification and the appended claims of the disclosure. People skilled in the art should understand that electronic apparatus manufacturers may refer to same elements under different names. The disclosure does not intend to distinguish between elements having same functions but different names. In the following specification and claims, the words "having" and "including" are open-ended words and thus should be interpreted as "including but not limited to."

Wordings used herein to indicate directions, such as "up," "down," "front," "back," "left," and "right," merely refer to directions in the accompanying drawings. Therefore, the directional wordings are used to illustrate rather than limit the disclosure. It should be understood that when an element or film layer is indicated to be disposed "on" or be "connected to" another element or film layer, the element or film layer may be directly on or be directly connected to another element or film layer, or other elements or film layers may exist therebetween (not directly). In contrast, when an element or film layer is indicated to be "directly on" another element or film layer or "directly connected to" another element or film layer, other elements or film layers do not exist therebetween.

The terms "approximately," "equal to," "equivalent to," "same," "substantially," or "roughly" referred to herein generally mean within a range of 10% of a given value, or mean a range of 5%, 3%, 2%, 1%, or 0.5% of a given value. In addition, the phrases "in a given range from a first value to a second value" and "within a given range from a first value to a second value" indicate the given range includes the first value, the second value, and other values therebetween.

In some embodiments of the disclosure, terms concerning attachments and connections such as "connected," "interconnected," and the like, unless defined otherwise, mean two structures directly contact each other, or mean the two structures do not directly contact each other and other structures are disposed therebetween. The terms concerning attachments and connections may also include a relationship in which the two structures are both movable or fixed. In addition, the terms "electrically connected to" and "coupled to" include any direct and indirect electrical connection means. Moreover, the terms such as "first" and "second" mentioned in the specification or the claims are only used to name different elements or to distinguish different embodiments or scopes, and are not intended to limit the upper or lower limit of the number of the elements, nor are they intended to limit the manufacturing order or disposition order of the elements.

In the disclosure, an electronic device may include, but not limited to, a display device, an antenna device, a sensing device, a light emitting device, or a splicing device. The electronic device may be a bendable electronic device or a flexible electronic device. The electronic device may include, for example, a liquid crystal layer or a light emitting diode (LED). The light emitting diode may include, for example but not limited to, an organic light emitting diode (OLED), a mini light emitting diode (mini LED), a micro light emitting diode (micro LED), or a quantum dot light emitting diode (QLED or QDLED), fluorescence, phosphors, other suitable materials, or a combination of the above, but the disclosure is not limited thereto. Hereinafter, the display device is used as the electronic device to describe the disclosure, but the disclosure is not limited thereto.

The display device of the disclosure may be a non-self-luminous display device, such as a liquid crystal display device, but the disclosure is not limited thereto. Hereinafter, the liquid crystal display device is used as the display device to describe the disclosure, but the disclosure is not limited thereto.

Figure 2:
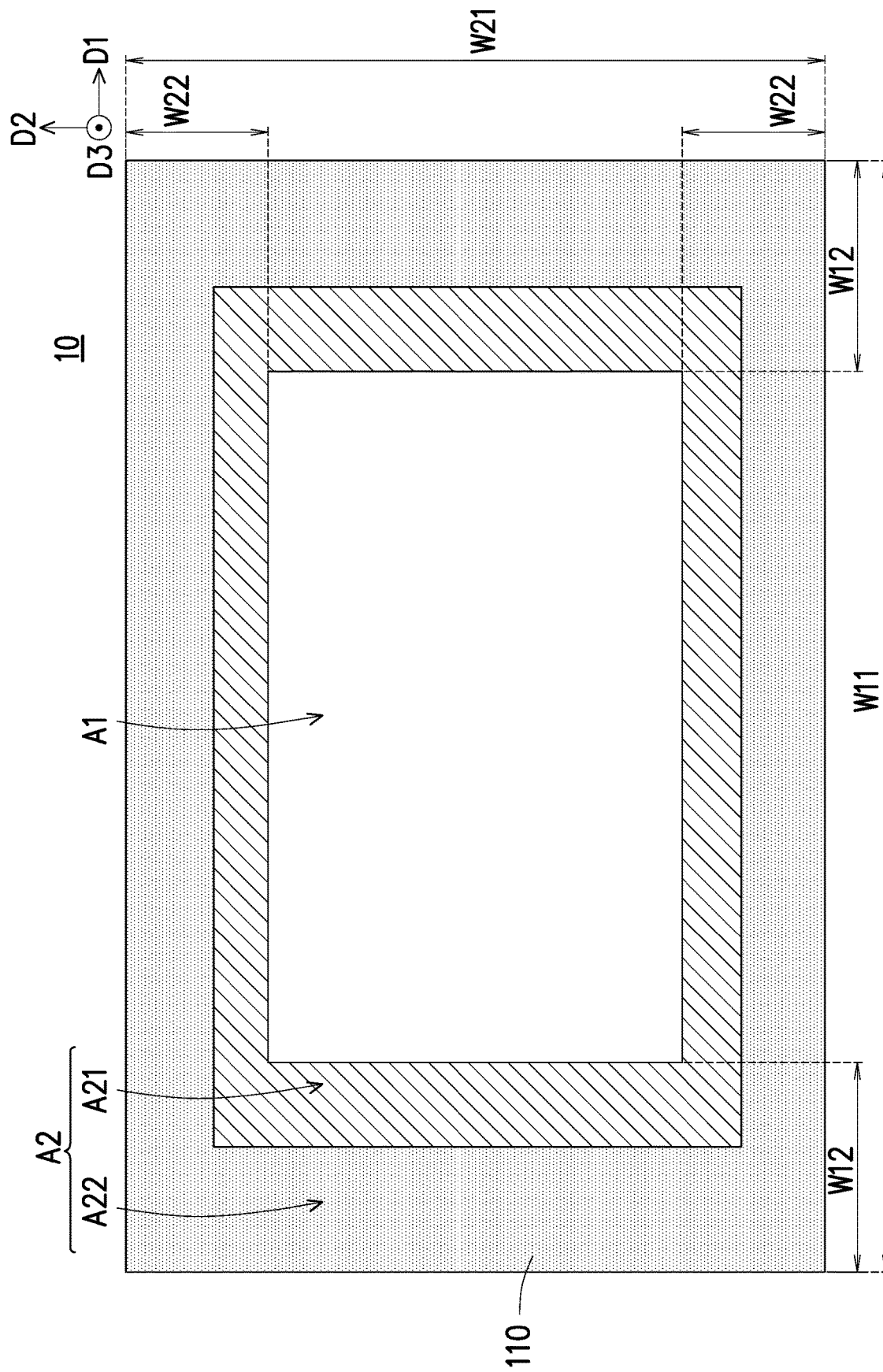
FIG. 2 is a schematic top view of a backlight module in FIG. 1.
Figure 3A:
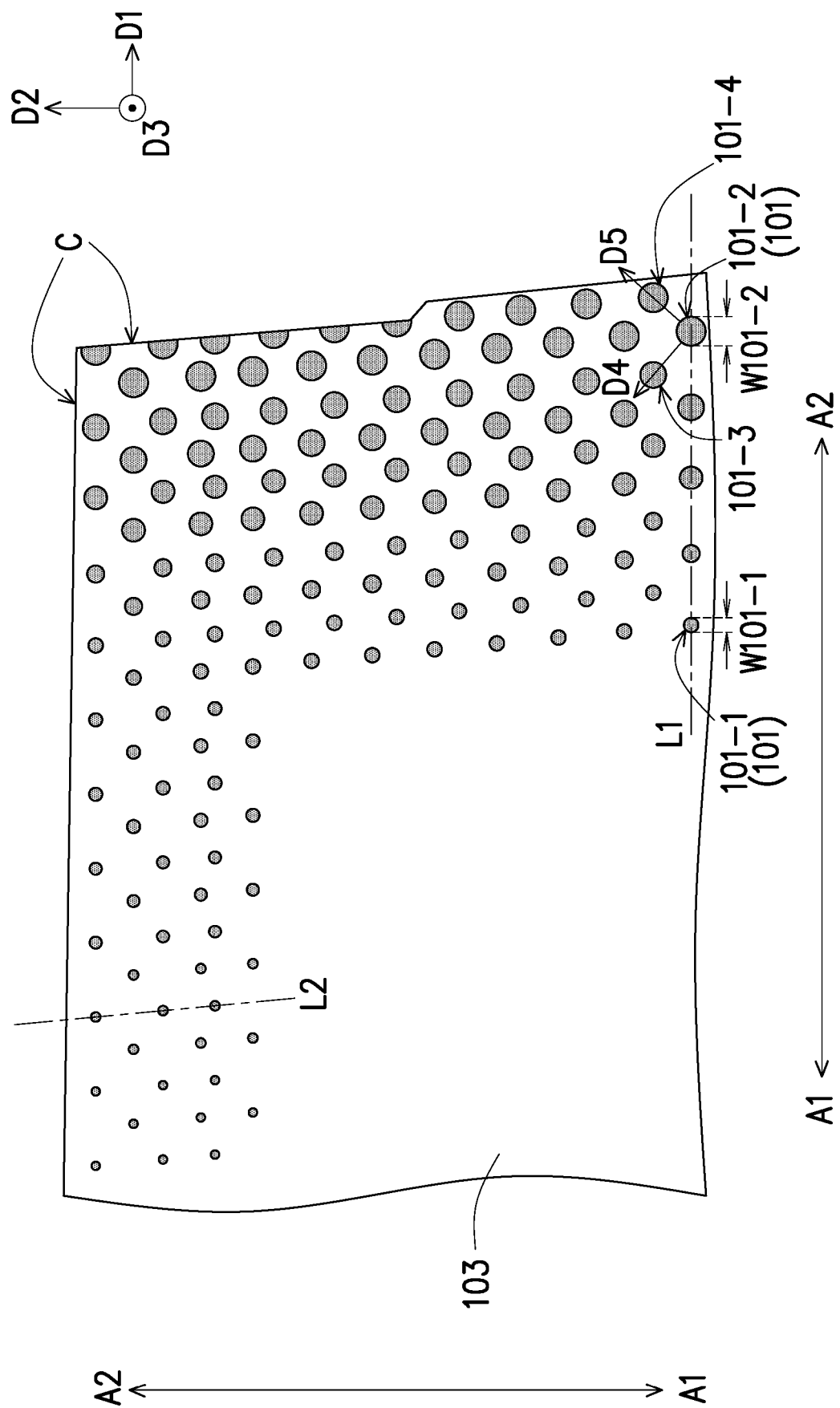
FIG. 3A and FIG. 3B are the first partial schematic top views of different regions of a reflecting layer on which multiple light conversion patterns are disposed.
Figure 3B:
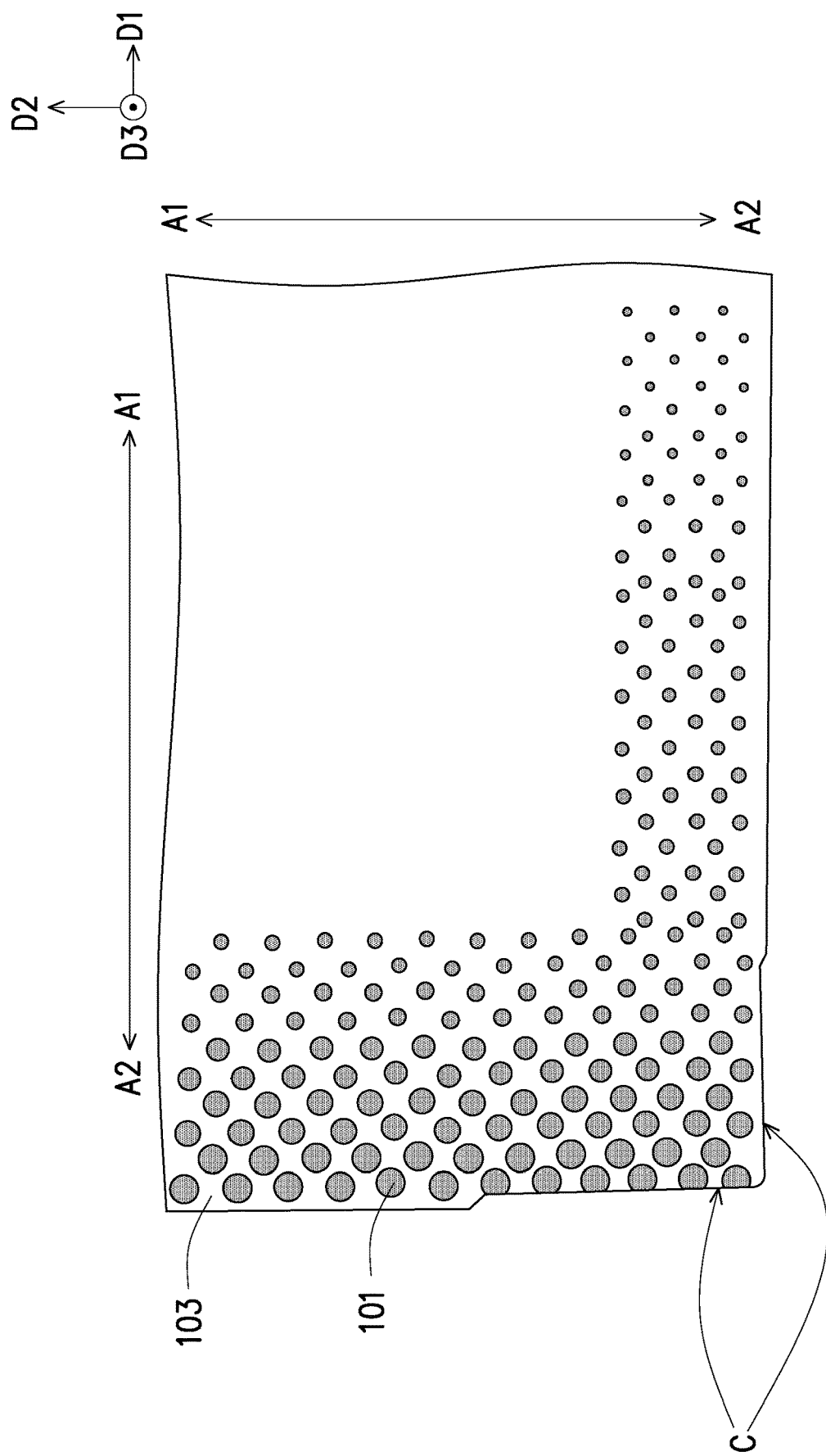
Figure 4A:
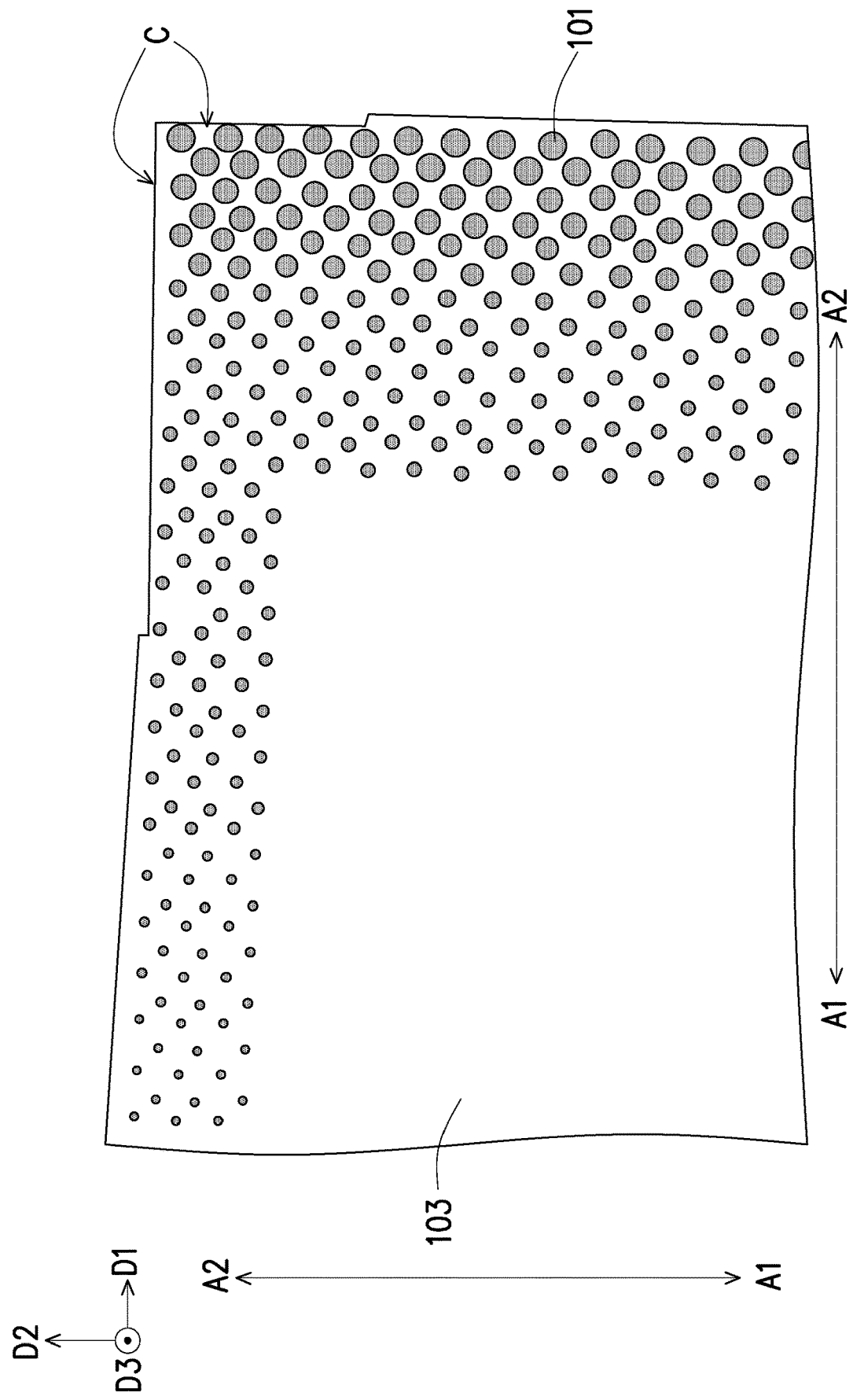
FIG. 4A and FIG. 4B are the second partial schematic top views of different regions of the reflecting layer on which multiple light conversion patterns are disposed.
Figure 4B:
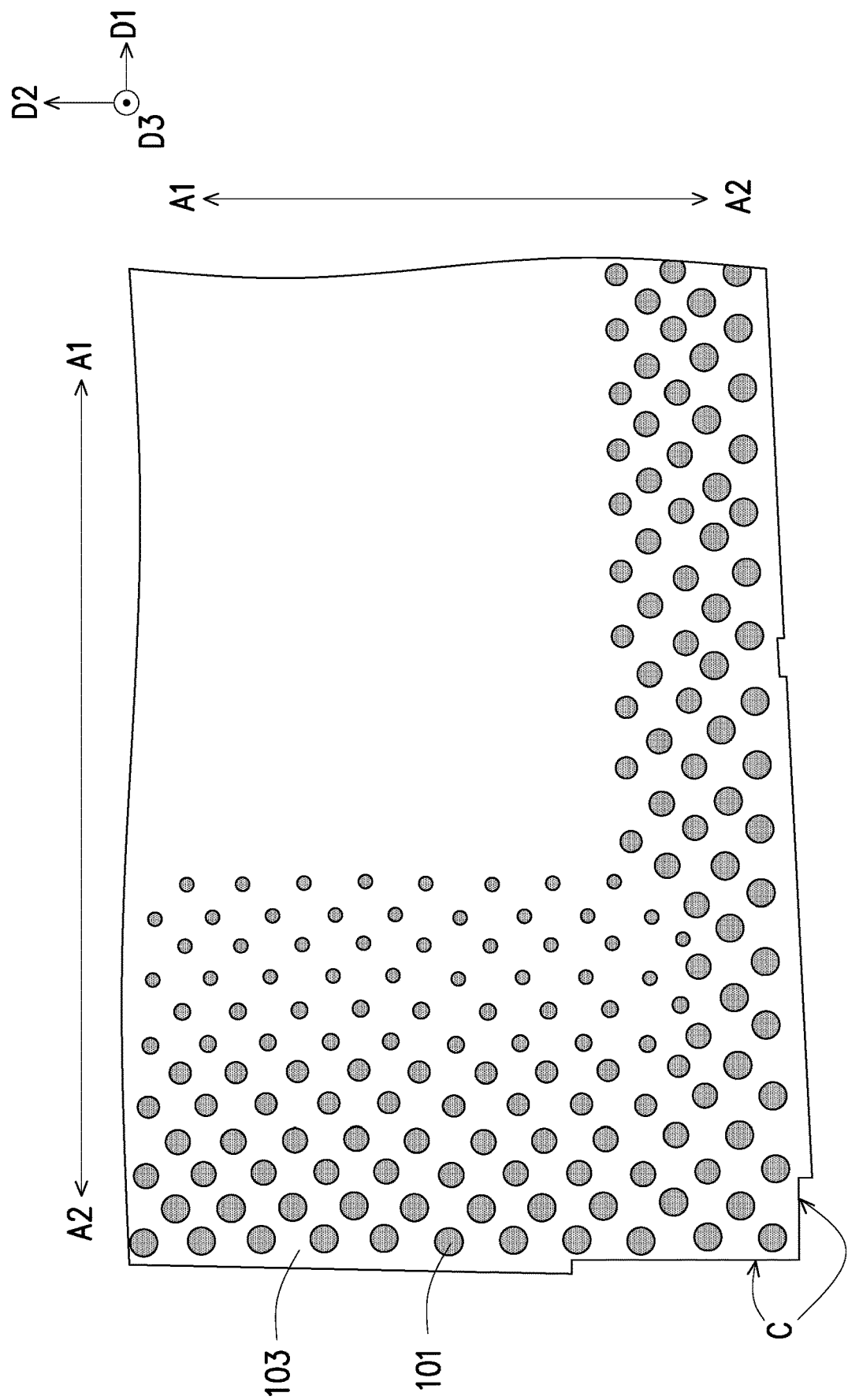
Figure 5A:
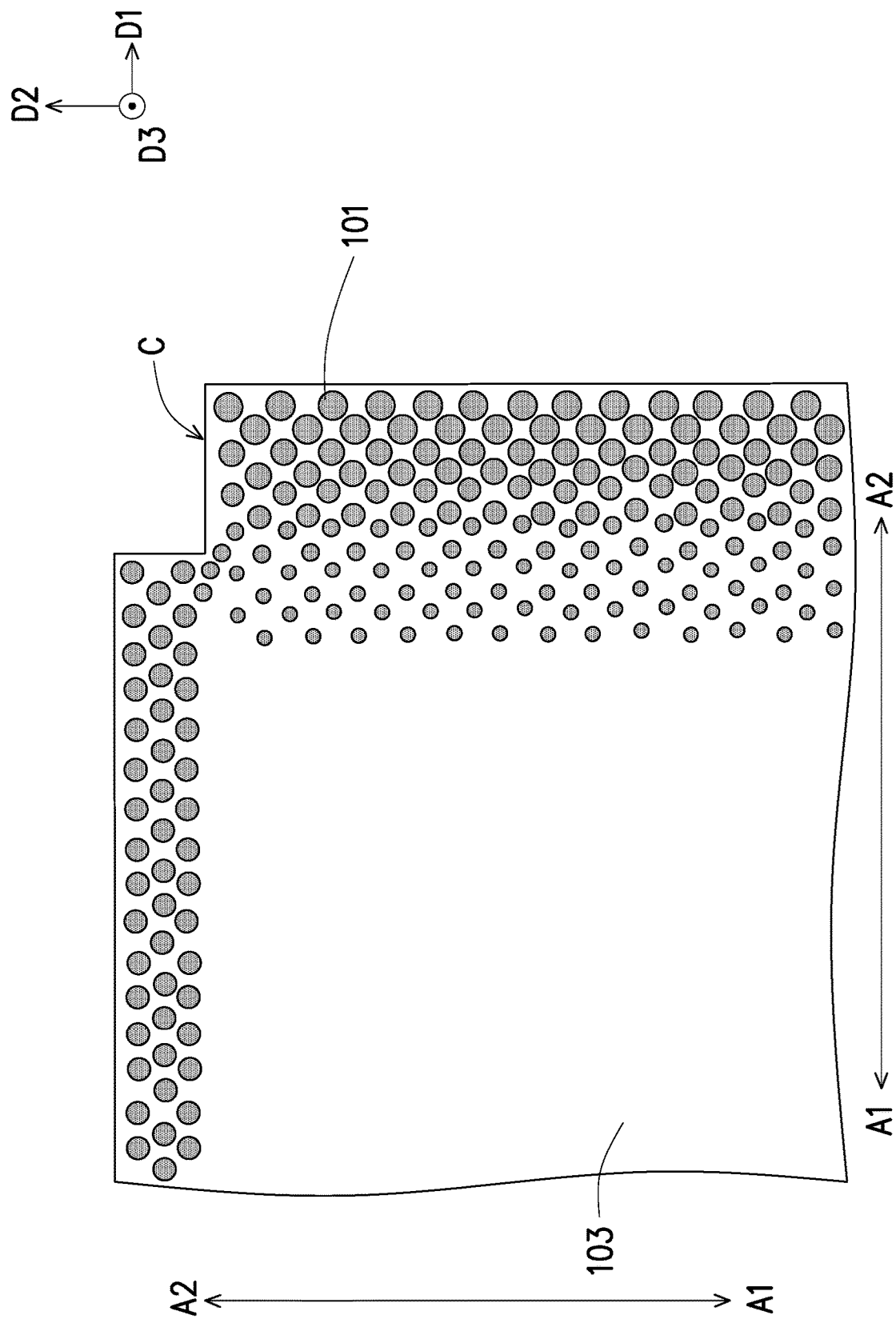
FIG. 5A and FIG. 5B are the third partial schematic top views of different regions of the reflecting layer on which multiple light conversion patterns are disposed.
Figure 5B:
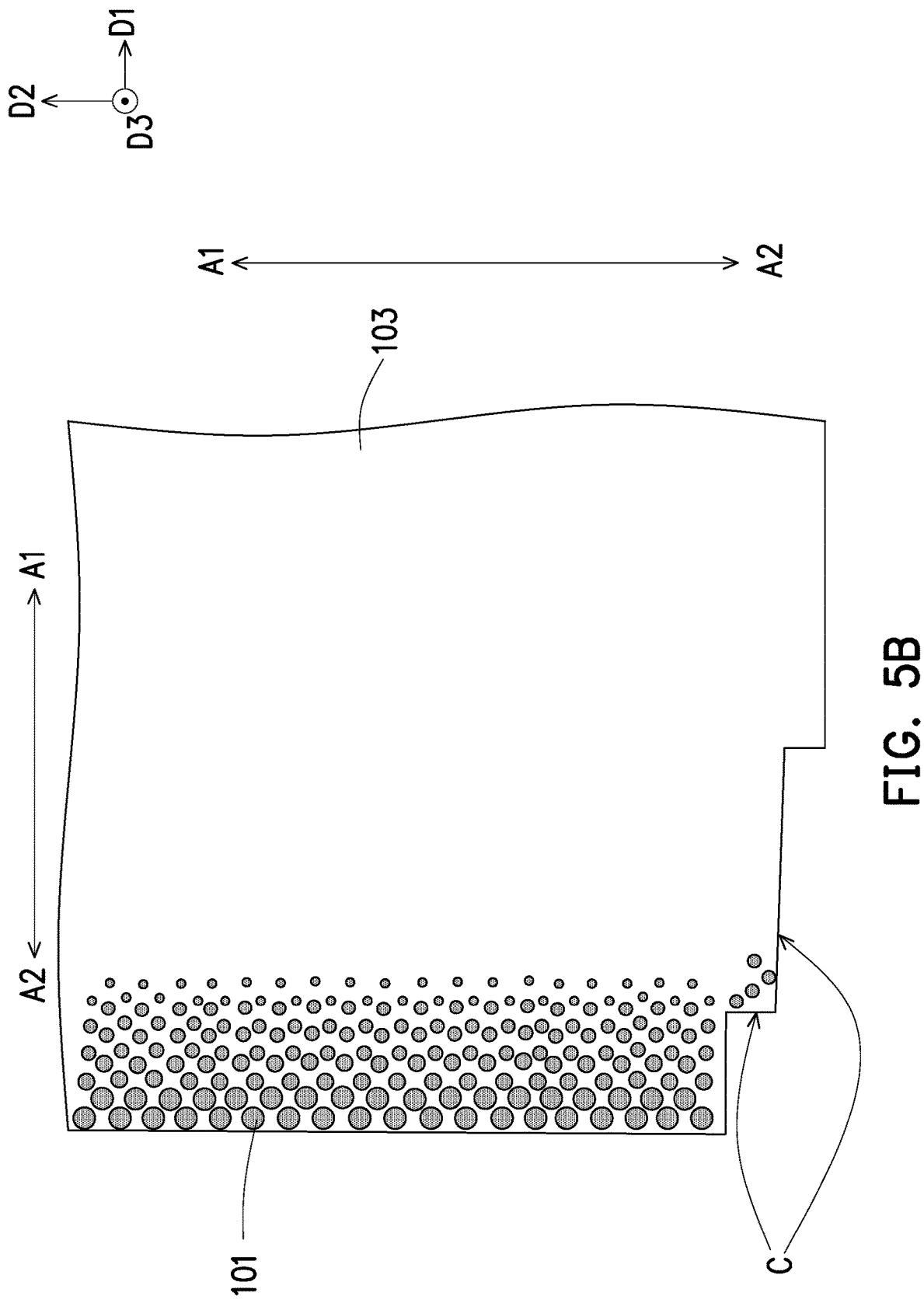
Figure 7A:
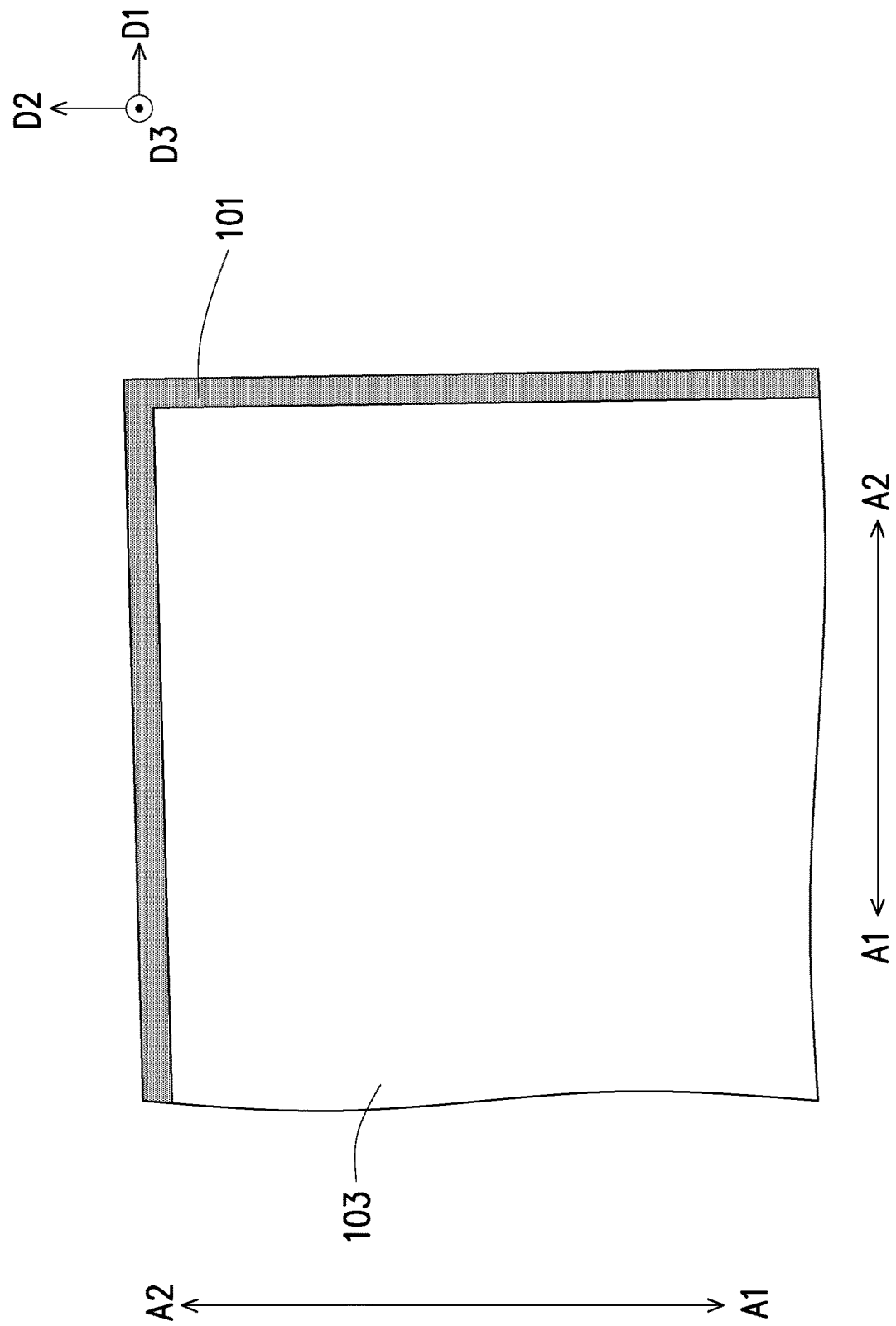
FIG. 7A and FIG. 7B are the fifth partial schematic top views of different regions of the reflecting layer on which multiple light conversion patterns are disposed.
Figure 7B:
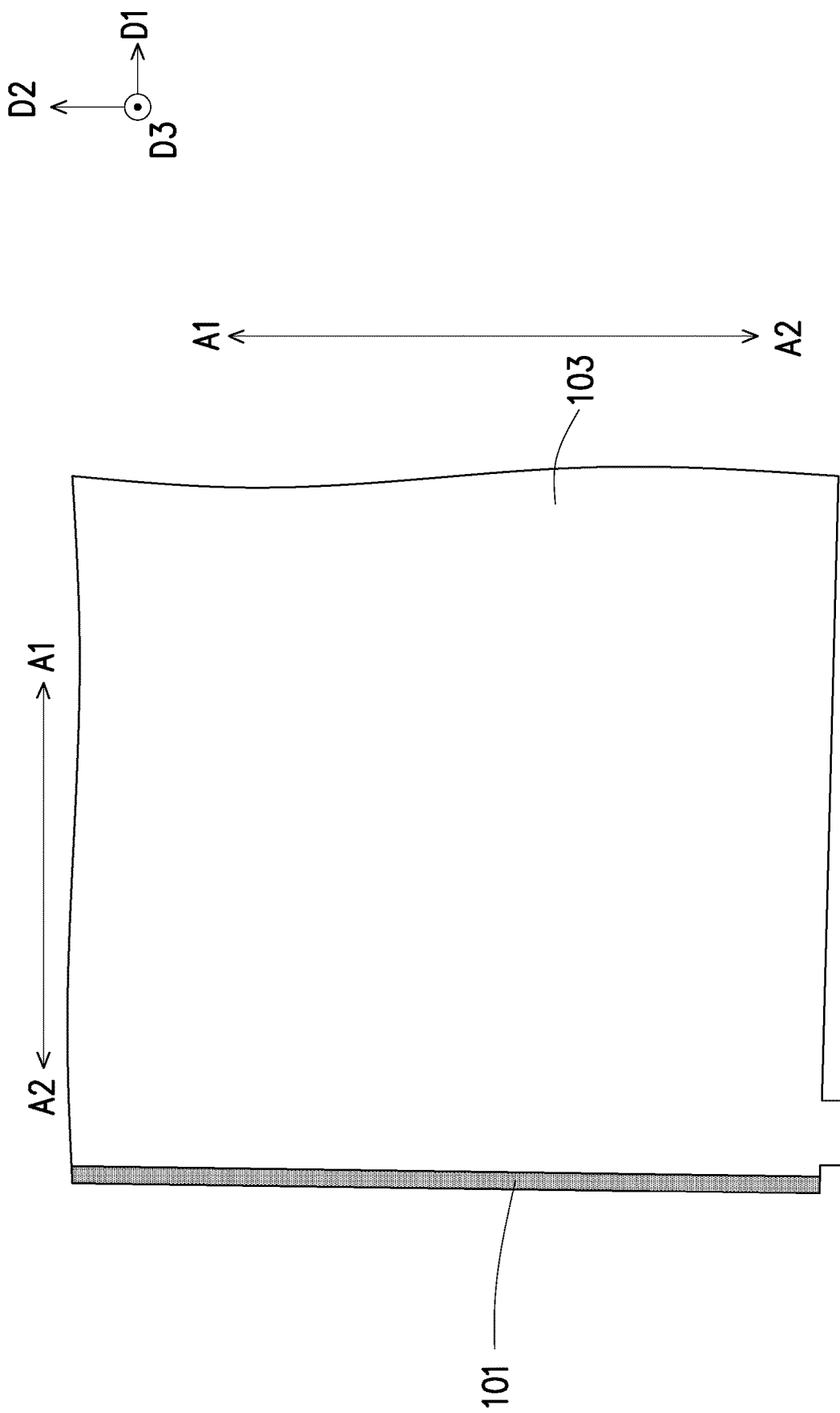
Figure 8:
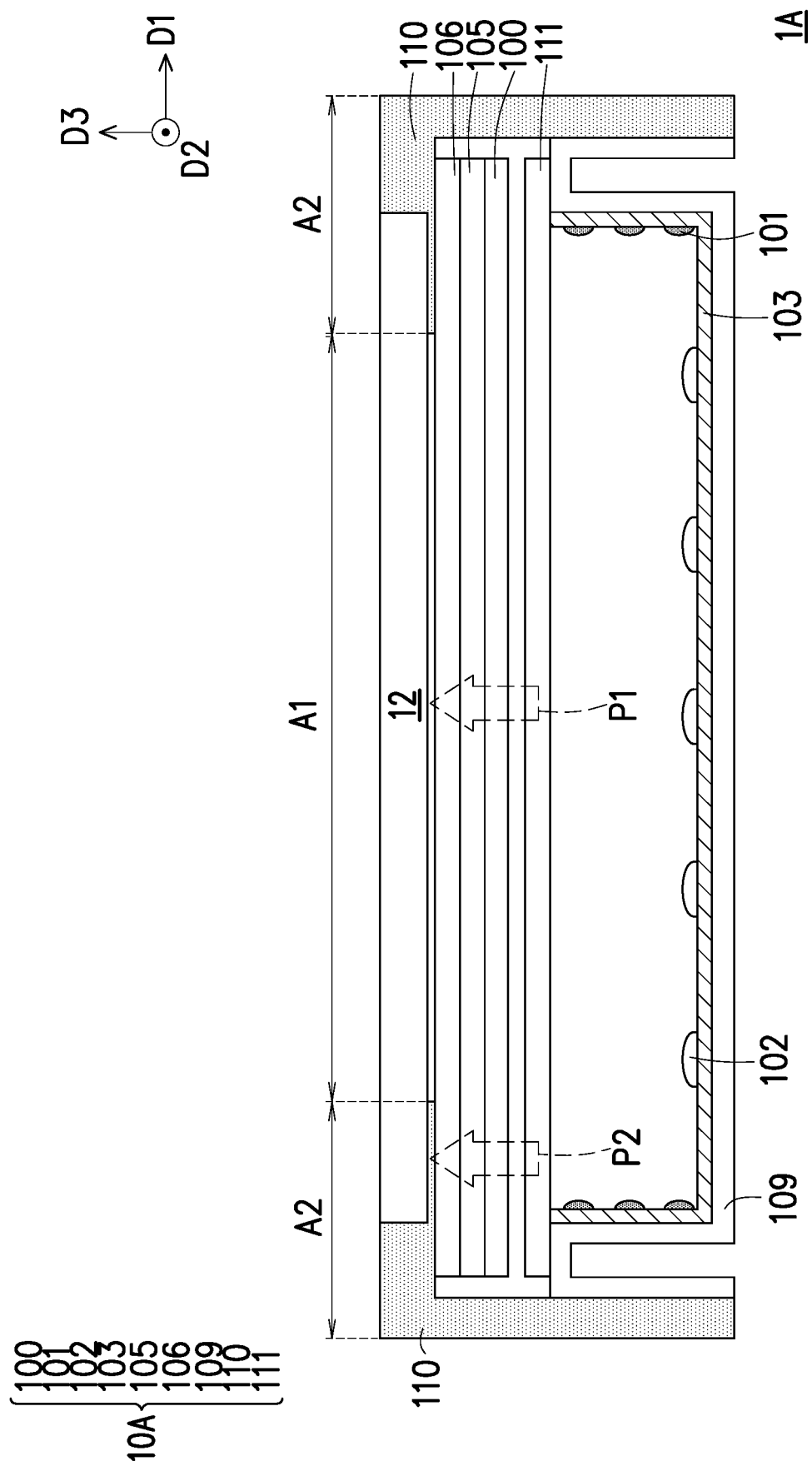
FIG. 8 is a schematic cross-sectional view of an electronic device according to another embodiment of the disclosure.
Figure 9:
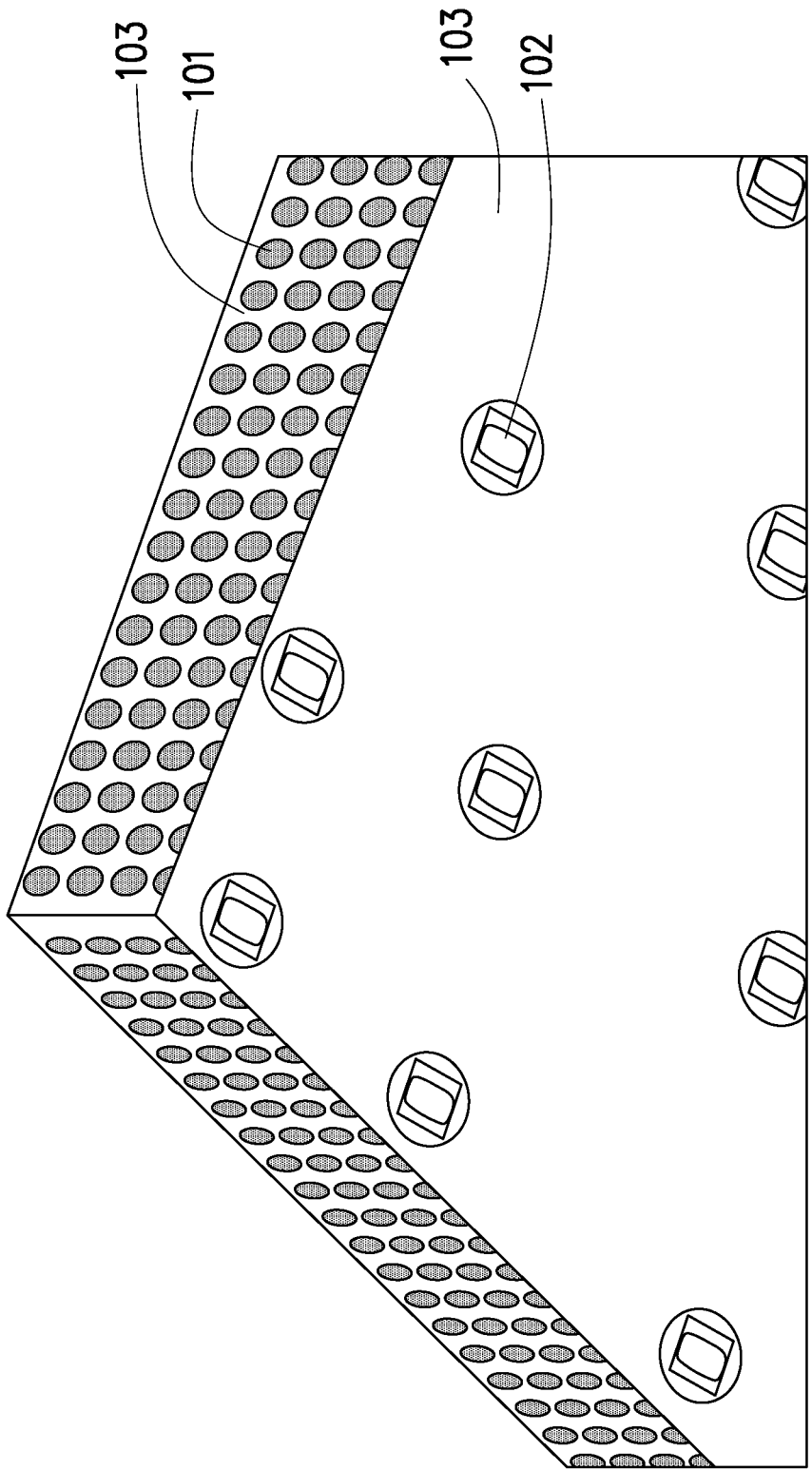
FIG. 9 is a partially enlarged schematic view of a backlight module in FIG. 8.
Figure 10:
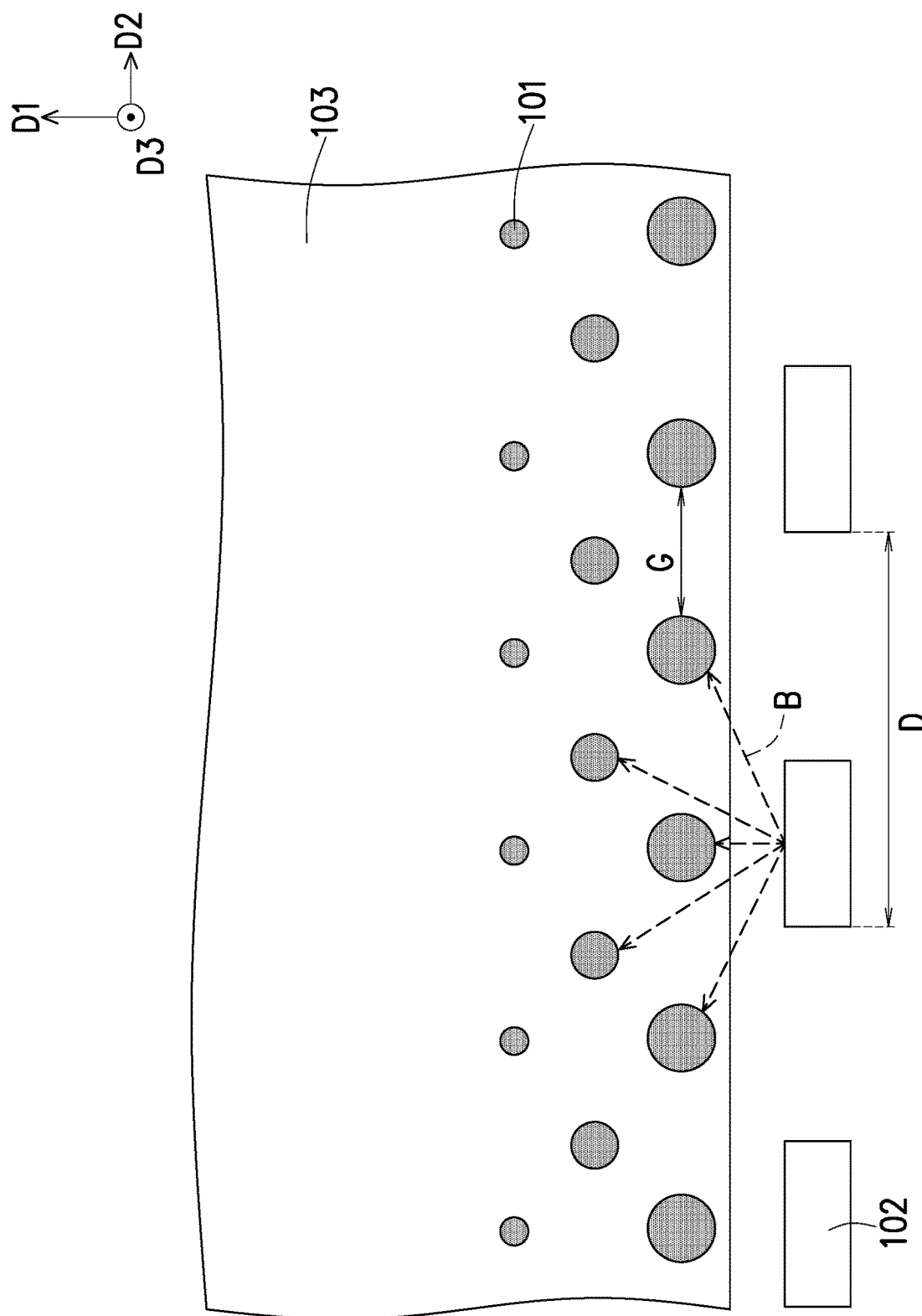
FIG. 10 is a partial schematic top view of a backlight module according to an embodiment of the disclosure.
Figure 11:
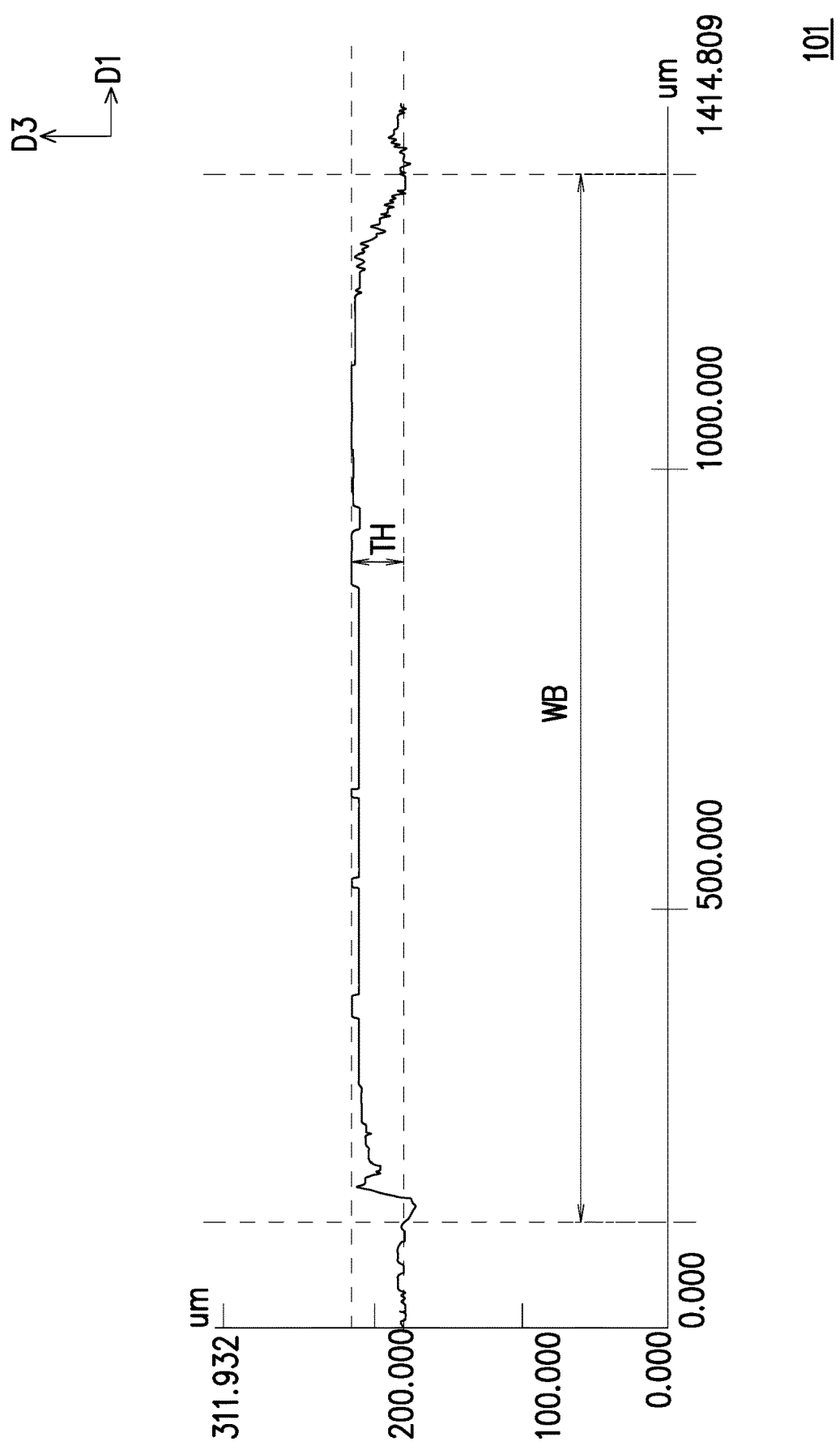
FIG. 11 is a schematic cross-sectional view of the light conversion pattern.

FIG. 1 is a schematic cross-sectional view of an electronic device according to an embodiment of the disclosure. FIG. 2 is a schematic top view of a backlight module in FIG. 1. FIG. 3A and FIG. 3B are the first partial schematic top views of different regions of a reflecting layer on which multiple light conversion patterns are disposed. FIG. 4A and FIG. 4B are the second partial schematic top views of different regions of the reflecting layer on which multiple light conversion patterns are disposed. FIG. 5A and FIG. 5B are the third partial schematic top views of different regions of the reflecting layer on which multiple light conversion patterns are disposed. FIG. 6A and FIG. 6B are the fourth partial schematic top views of different regions of the reflecting layer on which multiple light conversion patterns are disposed. FIG. 7A and FIG. 7B are the fifth partial schematic top views of different regions of the reflecting layer on which multiple light conversion patterns are disposed. FIG. 8 is a schematic cross-sectional view of an electronic device according to another embodiment of the disclosure. FIG. 9 is a partially enlarged schematic view of a backlight module in FIG. 8. FIG. 10 is a partial schematic top view of a backlight module according to an embodiment of the disclosure. FIG. 11 is a schematic cross-sectional view of the light conversion pattern.

In the embodiments of the disclosure, the same or similar elements will be designated by the same or similar reference numerals, and descriptions thereof will be omitted. In addition, as long as the features in different embodiments do not violate or conflict with the spirit of the disclosure, they may be arbitrarily disassembled, mixed, and matched, and simple equivalent changes and modifications made in accordance with this specification or claims are still within the scope of the disclosure.

With reference to FIG. 1 and FIG. 2, an electronic device 1 may include, but not limited to, a backlight module 10 and a display panel 12 disposed on the backlight module 10. According to different requirements, the electronic device 1 may further include one or more elements or film layers, and details thereof are not repeated herein.

The backlight module 10 has a main region A1 and a peripheral region A2 near the main region A1. In some embodiments, as shown in FIG. 2, the peripheral region A2 is near the main region A1 and may surround the main region A1 and be connected to the main region A1, but the disclosure is not limited thereto. In some embodiments, the maximum width of the peripheral region A2 in a direction may be 10% of the maximum width of the backlight module 10 in the same direction. For example, a maximum width W12 of a side (e.g., the left side) of the peripheral region A2 in a first direction D1 may be 10% of a maximum width W11 of the backlight module in the first direction D1. Similarly, the maximum width W12 of another side (e.g., the right side) of the peripheral region A2 in the first direction D1 may be 10% of the maximum width W11 of the backlight module 10 in the first direction D1, and/or a maximum width W22 of a side (e.g., the upper side) of the peripheral region A2 in a second direction D2 may be 10% of a maximum width W21 of the backlight module 10 in the second direction D2. Similarly, the maximum width W22 of another side (e.g., the lower side) of the peripheral region A2 in the second direction D2 may be 10% of the maximum width W21 of the backlight module 10 in the second direction D2. The second direction D2 and the first direction D1 are different. For example, the second direction D2 may be perpendicular to the first direction D1.

The backlight module 10 may include, but not limited to, a light conversion layer 100, multiple light conversion patterns 101, and multiple light emitting units 102 (only one schematically shown in FIG. 1). According to different requirements, the backlight module 10 may further include one or more elements or film layers. For example, the backlight module 10 may include, but not limited to, a reflecting layer 103, a light guide element 104, an optical film sheet 105, an optical film sheet 106, a circuit board 107, an adhesive layer 108, a backing plate 109, and a plastic frame 110.

If the backlight module 10 includes the plastic frame 110, the maximum width W11 of the backlight module 10 in the first direction D1 refers to the maximum distance between two opposite outer edges of the plastic frame 110 in the first direction D1, and the maximum width W21 of the backlight module 10 in the second direction D2 refers to the maximum distance between the two opposite outer edges of the plastic frame 110 in the second direction D2. If the backlight module 10 does not include the plastic frame 110, the maximum width W11 of the backlight module 10 in the first direction D1 refers to the maximum distance between two opposite outer edges of the backing plate 109 in the first direction D1, and the maximum width W21 of the backlight module 10 in the second direction D2 refers to the maximum distance between the two opposite outer edges of the backing plate 109 in the second direction D2. It should be understood that the maximum width W12 and the maximum width W22 of the peripheral region A2 may be the same or different.

In some embodiments, the peripheral region A2 may include a first region A21 and a second region A22. The first region A21 is located between the main region A1 and the second region A22. If the backlight module 10 includes the plastic frame 110, the second region A22 may be defined by the plastic frame 110. For example, the second region A22 is substantially the same as where the plastic frame 110 is located when viewed in the normal direction of the backlight module 10 (e.g., a third direction D3 perpendicular to the first direction D1 and the second direction D2). If the backlight module 10 does not include the plastic frame 110, the second region A22 is substantially the same as the region between the edge of the light conversion pattern 101 adjacent to the backing plate 109 and the outer edge of the backing plate 109 when viewed, for example, in the third direction D3.

The light conversion layer 100 may include a mono-layer or multi-layer structure. In some embodiments, the light conversion layer 100 is disposed between the optical film sheet 105 and the light guide element 104, but the disclosure is not limited thereto. For example, when the light conversion layer 100 is irradiated by a short-wavelength light beam, at least a portion of the short-wavelength light beam (e.g., blue light) may be converted into a long-wavelength light beam (e.g., red light, green light, or yellow light, etc.), but the disclosure is not limited thereto. In some embodiments, the material of the light conversion layer 100 may include, but not limited to, fluorescence, phosphorescence, quantum dots (QD), other suitable materials, or a combination of at least two of the foregoing. In some embodiments, the light conversion layer 100 may be formed on a film before fixed on the light guide element 104, or may be directly coated on the light guide element 104. Alternatively, the light conversion layer 100 may be disposed between the light emitting element 102 and the light guide element 104, or may be disposed in the light guide element 104, but the disclosure is not limited thereto.

The light conversion patterns 101 may be located in the peripheral region A2. In some embodiments, the light conversion patterns 101 are disposed on the reflecting layer 103 and are located between the light guide element 104 and the reflecting layer 103. In some embodiments, a portion of the light conversion pattern 101 may be located in the main region A1 and near the peripheral region A2. For example, the light conversion patterns 101, when irradiated by a short-wavelength light beam, may convert at least a portion of the short-wavelength light beam (e.g., blue light) into a long-wavelength light beam (e.g., red light, green light, yellow light, or blue light of wavelength longer than the incident light/incident light beam, etc.), but the disclosure is not limited thereto. In some embodiments, the material of the light conversion patterns 101 may include, but not limited to, fluorescence, phosphorescence, quantum dots, other suitable materials, or a combination of at least two of the foregoing.

The light emitting units 102 are located in the peripheral region A2. Taking an edge-type backlight module as an example, the light emitting units 102 may be disposed near a lateral surface S1 of the light guide element 104. In another embodiment, the light emitting units 102 may be disposed near the lateral surface S1 and a lateral surface S1' of the light guide element 104 opposite to each other, but the disclosure is not limited thereto. The light emitting units 102 may be disposed on the circuit board 107 and be electrically connected to the circuit board 107. The light emitting units 102 may include the aforementioned light emitting diode, and details thereof are not repeated herein.

The light emitting units 102 can emit a light beam B. For example, the light emitting units 102 may be blue light emitting diodes, and the light beam B is blue. A portion of the light beam B (blue light) from the light emitting units 102 may be converted into yellow light by the light conversion patterns 101 or the light conversion layer 100, while a portion of the light beam B (blue light) not converted by the light conversion patterns 101 or the light conversion layer 100 may be mixed with the yellow light after conversion to form white light. In detail, a portion of the light beam B from the light emitting units 102 enters the light guide element 104 through the lateral surface S1 of the light guide element 104, and is transmitted in the light guide element 104 from the peripheral region A2 toward the main region A1 by total internal reflection. Microstructures (not shown) or mesh points (not shown) disposed on a bottom surface S2 of the light guide element 104 can destroy total internal reflection, such that a portion of the light beam B can be transmitted through a top surface S3 of the light guide element 104 out of the light guide element 104. The portion of the light beam B transmitted out of the light guide element 104 may be converted into yellow light by the light conversion layer 100, and the yellow light after conversion may be mixed with a portion of blue light in the light beam B transmitted out of the light guide element 104 to form white light. On the other hand, for example, another portion of the light beam B from the light emitting units 102 (e.g., a light beam with a large angle) does not enter the light guide element 104 and is transmitted to the light conversion patterns 101, or enters the light guide element 104 through the lateral surface S1 and is transmitted out of the light guide element 104 through the bottom surface S2, such that the light conversion patterns 101 convert the portion of the light beam B transmitted thereto into yellow light. The portion of the light beam B (blue light) not converted by the light conversion patterns 101 may be mixed with the yellow light after conversion to form white light.

The reflecting layer 103 is disposed on the backing plate 109 and between the bottom surface S2 of the light guide element 104 and the backing plate 109. The reflecting layer 103 may reflect the light beam B transmitted away from the display panel 12, which may improve the light utilization rate of the backlight module 10. In some embodiments, the reflecting layer 103 may include a white reflecting sheet, a white tape, or a metal reflecting sheet; alternatively, the reflecting layer 103 may be disposed on the backing plate 109 through a coating process, but the disclosure is not limited thereto. In some embodiments, the reflecting layer 103 may be further disposed between the lateral surface S1' of the light guide element 104 away from the light emitting element 102 and the backing plate 109 to improve the light utilization rate of the backlight module 10.

The light guide element 104 is disposed between the reflecting layer 103 and the light conversion layer 100. In some embodiments, at least one of the bottom surface S2 and the top surface S3 of the light guide element 104 may be formed with multiple microstructures (not shown) or multiple mesh points (not shown). In some embodiments, the material of the light guide element 104 may include, but not limited to, plastic, glass, or the like.

The optical film sheet 105 and the optical film sheet 106 are disposed on the light conversion layer 100 and are located between the display panel 12 and the light conversion layer 100. In some embodiments, the optical film sheet 105 and the optical film sheet 106 may respectively be a diffuser sheet and a prism sheet, but the disclosure is not limited thereto. In other embodiments not shown, the backlight module 10 may include, but not limited to, one or more diffuser sheets, one or more prism sheets, and/or one or more other optical film sheets.

The circuit board 107 may be attached on the side wall of the backing plate 109 through the adhesive layer 108, such that the light emitting units 102 face the lateral surface S1 of the light guide element 104. In some embodiments, the circuit board 107 may include a printed circuit board, and the adhesive layer 108 may include, but not limited to, a tape or an optical adhesive.

The plastic frame 110 may be disposed on the backing plate 109 and carry the display panel 12. A portion of the plastic frame 110 may be disposed on the outer side of the side wall of the backing plate 109, and an accommodating space may be formed between the plastic frame 110 and the backing plate 109, which may allow the light guide element 104, the light conversion layer 100, the optical film sheet 105, and the optical film sheet 106 to be accommodated in the accommodating space between the plastic frame 110 and the backing plate 109. In some embodiments, the plastic frame 110 may be disposed on the backing plate 109 and carry the display panel 12, the optical film sheet 105, and the optical film sheet 106. A portion of the plastic frame 110 may be disposed on the outer side of the side wall of the backing plate 109, and an accommodating space may be formed between the plastic frame 110 and the backing plate 109, which may allow the light guide element 104 and the light conversion layer 100 to be accommodated in the accommodating space. The optical film 105 and the optical film sheet 106 may be disposed between the plastic frame 110 and the display panel 12. In some embodiments, the plastic frame 110 may be made of an opaque material to shield the elements thereunder.

In some embodiments, when the backlight module 10 does not include the plastic frame 110, the backing plate 109 may carry the display panel 12, and an accommodating space may be formed between the display panel 12 and the backing plate 109, which may allow the light guide element 104, the light conversion layer 100, the optical film sheet 105, and the optical film sheet 106 to be accommodated in the accommodating space.

The display panel 12 may be disposed above the optical film sheet 106 through the plastic frame 110. In some embodiments, the display panel 12 may include, but not limited to, a non-self-luminous display panel, such as a liquid crystal display panel.

The light beam B may form white light after passing through the light conversion layer 100. The white light passes through the optical film sheet 105 and the optical film sheet 106 in sequence and may serve as the light source of the display panel 12.

A first portion light beam P1 emitted from the main region A1 has at least one corresponding position (chromaticity point) in the CIE 1931 color space. A second portion light beam P2 emitted from the peripheral region A2 has at least one corresponding position (chromaticity point) in the CIE 1931 color space. One among the at least one corresponding position of the first portion light beam P1 of the light beam B has corresponding coordinates (x1, y1). One among the at least one corresponding position of the second portion light beam P2 of the light beam B has corresponding coordinates (x2, y2). The corresponding coordinates (x1, y1) and the corresponding coordinates (x2, y2) may satisfy the following relation: $0 \leq |x1-x2| \leq 0.2$. In some embodiments, the corresponding coordinates (x1, y1) and the corresponding coordinates (x2, y2) may further satisfy the following relation: $0 \leq |y1-y2| \leq 0.3$.

Specifically, the light conversion patterns 101 disposed near one or more edges of the backlight module 10 may convert blue light into yellow light. The blue light and the yellow light are mixed to form white light, thereby addressing the problem of white light color point shift in the peripheral region A2. In this way, white light performance in the main region A1 and that in the peripheral region A2 of the backlight module 10 become consistent and then satisfy $0 \leq |x1-x2| \leq 0.2$ or further satisfy $0 \leq |y1-y2| \leq 0.3$.

In some embodiments, the corresponding coordinates (x1, y1) and the corresponding coordinates (x2, y2) may further satisfy the following relation: $0 \leq |x1-x2| \leq 0.1$ or $0 \leq |x1-x2| \leq 0.05$. In some embodiments, the corresponding coordinates (x1, y1) and the corresponding coordinates (x2, y2) may further satisfy the following relation: $0 \leq |y1-y2| \leq 0.15$ or $0 \leq |y1-y2| \leq 0.05$.

Display panels in three different sizes are listed in Table 1 below as examples, but it should be understood that Table 1 is only for exemplification and not for limiting the disclosure. In Table 1, the corresponding coordinates (x1, y1) are, for example, a chromaticity point of any place within the range of 12% to 15% of the distance from the edge of the backlight module in the main region of the backlight module. The corresponding coordinates (x2, y2) are, for example, a chromaticity point of any place within the peripheral region of the backlight module near the main region. According to Table 1, the light conversion patterns help make the white light performance in the main region and that in the peripheral region of the backlight module to become consistent.

TABLE 1

| screen size | 49 inches | 55 inches | 65 inches |
| --- | --- | --- | --- |
| x1 | 0.260~0.270 | 0.260~0.272 | 0.260~0.275 |
| y1 | 0.230~0.240 | 0.230~0.245 | 0.230~0.243 |
| x2 | 0.270~0.296 | 0.272~0.293 | 0.270~0.280 |
| y2 | 0.255~0.280 | 0.240~0.276 | 0.240~0.253 |
| \|x1-x2\| | 0.000~0.036 | 0.000~0.033 | 0.005~0.020 |
| \|y1-y2\| | 0.015~0.050 | 0.005~0.046 | 0.003~0.023 |

In some embodiments, as shown in FIG. 3A to FIG. 6B, the shape of the light conversion pattern 101 may be similar to a circle or an ellipse when viewed from the top, but the disclosure is not limited thereto. In addition, as shown in FIG. 3A, the light conversion patterns 101 may include a first light conversion pattern 101-1 and a second light conversion pattern 101-2. The first light conversion pattern 101-1 is closer to the main region A1 than the second light conversion pattern 101-2. Taking FIG. 3A as an example, the light emitting units (not shown) are arranged along the second direction D2, and a dotted line L1 may be shown in the top view, starting from any place in the main region A1 to the peripheral region A2 and being perpendicular to the second direction D2 (e.g., parallel to the first direction D1).

The light conversion pattern 101 closest to the main region A1 on this dotted line L1 serves as the first light conversion pattern 101-1, and the light conversion pattern farthest from the main region A1 on this dotted line L1 serves as the second light conversion pattern 101-2. In the top view, the first light conversion pattern 101-1 and the second light conversion pattern 101-2 may have different widths. For example, a maximum width W101-1 (the maximum width in the first direction D1) of the first light conversion pattern 101-1 may be less than a maximum width W101-2 (the maximum width in the first direction D1) of the second light conversion pattern 101-2).

In some embodiments, as shown in FIG. 3A to FIG. 6B, the maximum width of the light conversion patterns 101 near the peripheral region A2 may be greater than the maximum width of the light conversion patterns 101 near the main region A1, such that blue light near the periphery region A2 can be more converted into yellow light to address the problem of white light color point shift.

In some embodiments, taking FIG. 3A as an example, the top view shows a dotted line L2 starting from any place in the main region A1 to the peripheral region A2 and being parallel to the second direction D2. The light conversion patterns on this dotted line L2 may substantially have the same maximum width, but the disclosure is not limited thereto.

In some embodiments, as shown in FIG. 3A to FIG. 6B, the light conversion patterns 101 may be arranged alternately. In other words, an included angle between a direction in which any light conversion pattern 101 and the nearest light conversion pattern 101 are arranged and a direction perpendicular to the arrangement direction of the light emitting units (e.g., the first direction D1) is not equal to 0 degrees or 90 degrees. Taking FIG. 3A as an example, the included angle between an arrangement direction D4 (or an arrangement direction D5) of the second light conversion pattern 101-2 and a light conversion pattern 101-3 (or a light conversion pattern 101-4) and the first direction D1 is not equal to 0 degrees or 90 degrees.

With the design of the alternately arranged light conversion patterns 101 increasing the probability of a traveling light beam in contact with the light conversion patterns 101, the probability of blue light being converted into yellow light may be increased, and the problem of white light color point shift may thus be addressed.

In some embodiments, the reflecting layer 103 may be cut to facilitate the assembly of the reflecting layer 103 and the backing plate 109. With this structure, as shown in FIG. 3A to FIG. 6B, the reflecting layer 103 has an edge C. In some embodiments, the light conversion patterns 101 disposed on the reflecting layer 103 may be cut as shown in FIG. 3A and FIG. 3B. In some embodiments, the light conversion patterns 101 disposed on the reflecting layer 103 may not be cut as shown in FIG. 4A and FIG. 4B. In some embodiments, the light conversion patterns 101 may be disposed on three edges of the reflecting layer 103, and one edge of the reflecting layer 103 is not disposed with any light conversion pattern as shown in FIG. 5A, FIG. 5B, FIG. 6A, and FIG. 6B. In some embodiments, one or all of the light conversion patterns 101 may be strip-shaped as shown in FIG. 7A and FIG. 7B.

With reference to FIG. 8 and FIG. 9, an electronic device 1A may include a backlight module 10A and the display panel 12. The main difference between the backlight module 10A and the backlight module 10 in FIG. 1 is that the backlight module 10A is a direct-type backlight module. In detail, the backlight module 10A may include, but not limited to, the light conversion layer 100, the light conversion patterns 101, the light emitting units 102, the reflecting layer 103, the optical film sheet 105, the optical film sheet 106, the backing plate 109, the plastic frame 110, and an optical film sheet 111.

In the backlight module 10A, the light emitting units 102 may be disposed on the reflecting layer 103, and the reflecting layer 103 may be composed of, but not limited to, the uppermost metal layer of a circuit board or a layer with reflection (e.g., white paint). In some embodiments, the reflecting layer 103 may further extend onto the side wall of the backing plate 109, and the light converting patterns 101 may be disposed on the reflecting layer 103 corresponding to the side wall of the backing plate 109. In one embodiment, the light conversion patterns 101 may be arranged into a matrix, and in another embodiment, the light conversion patterns 101 may also be arranged alternately, but the disclosure is not limited thereto.

One or more light conversion patterns 101 disposed near the backlight module 10A may convert a portion of blue light into yellow light, and the unconverted blue light may be mixed with the yellow light to form white light, thereby addressing the problem of white light color point shift in the peripheral region A2. In this way, white light performance in the main region A1 and that in the peripheral region A2 of the backlight module 10 become consistent and then satisfy $0 \leq |x1-x2| \leq 0.2$ or further satisfy $0 \leq |y1-y2| \leq 0.3$.

In some embodiments, the light conversion patterns 101 may have the same size (e.g., width), but the disclosure is not limited thereto.

With reference to FIG. 10, in some embodiments, for example, with the structure of an edge-type backlight module, a gap G between two adjacent ones among the light conversion patterns 101 may be greater than 0 and be less than or equal to half of a distance D between two adjacent ones among the light emitting units 102. For example, the gap G may be the minimum distance between two adjacent light conversion patterns 101 among the light conversion patterns 101 in the row closest to the light emitting units 102 in the arrangement direction of the light emitting units 102 (e.g., the first direction D1). The distance D refers to the minimum distance between two same sides of two adjacent light emitting units 102 in the first direction D1 (e.g., from the left side of one to the left side of the other, from the right side of one to the right side of the other, or from the middle of one to the middle of the other of the two adjacent light emitting units 102 as shown in FIG. 10).

With the above design, the conversion of the light beam B emitted by the light emitting units 102 into yellow light may be improved, the white light performance between two adjacent light emitting units 102 and in front of the light emitting units 102 may be improved, or the problem of uneven brightness of the backlight module 10 may be addressed.

Four screen sizes are listed in Table 2 below as examples, but it should be understood that Table 2 is only for exemplification and not for limiting the disclosure. In Table 2, the gap G of 0 means that the light conversion pattern adopts the strip pattern design as shown in FIG. 7A and FIG. 7B. For example, the strip light conversion pattern may be disposed on the edge of the reflecting layer near the light incident side, but the disclosure is not limited thereto. In other embodiments, the strip light conversion pattern may also be disposed on multiple (e.g., two, three, or four) edges of the reflecting layer.

TABLE 2

| screen size | 27 inches | 49 inches | 55 inches | 65 inches |
|---|---|---|---|---|
| gap G (mm) | 0 | 2.6 | 2.6 | 3.8 |

With reference to FIG. 11, in some embodiments, the cross-sectional shape of the light conversion pattern 101 may be substantially semi-elliptical and have a curved surface, but the disclosure is not limited thereto. For example, the light conversion pattern 101 may be formed on the reflecting layer (not shown in FIG. 11) by printing, spray coating, or the like. According to the cross-sectional view of the light conversion pattern 101, a maximum thickness TH of the light conversion pattern 101 in the third direction D3 is, for example, less than or equal to a bottom width WB of the light conversion pattern 101 (e.g., the maximum width in the first direction D1). With this design, the light conversion pattern 101 can generate a relatively even light pattern. If the maximum thickness TH is greater than the bottom width WB, the light pattern generated by the light conversion pattern 101 is more concentrated, making the backlight module prone to chromatic aberration. In some embodiments, TH/WB may fall within the range of 0.01 to 1.0, which means $0.01 \leq TH/WB \leq 1.0$.

Two screen sizes are listed in Table 3 below as examples, but it should be understood that Table 3 is only for exemplification and not for limiting the disclosure. In Table 3, the sizes of the light conversion patterns (e.g., the bottom widths) become increasingly greater from the main region to the peripheral region, which means the bottom width of the third light conversion pattern is greater than the bottom width of the second light conversion pattern, and the bottom width of the second light conversion pattern is greater than the bottom width of the first light conversion pattern. When TH/WB<0.1, the maximum thickness TH of the light conversion pattern is too small, and this may increase the probability of blue light leakage from the edge region and cause chromatic aberration to occur. When TH/WB>1, the maximum thickness TH of the light conversion pattern is too large, which means the light pattern generated by the light conversion pattern is rather concentrated and not diffuse, and the light guide element in a small, thin backlight module structure may be bent due to the relatively larger thickness of the light conversion pattern, which leads to uneven brightness of the backlight module.

TABLE 3

| | | main region <-> peripheral region | | |
|---|---|---|---|---|
| screen size | project | first light conversion pattern | second light conversion pattern | third light conversion pattern |
| 49 inches | maximum thickness TH (μm) | 52 | 43 | 46 |
| | bottom width WB (μm) | 456 | 885 | 1283 |
| | TH/WB | 0.11 | 0.05 | 0.035 |
| 65 inches | maximum thickness TH (μm) | 42 | 45 | 37 |
| | bottom width WB (μm) | 762 | 986 | 1229 |
| | TH/WB | 0.055 | 0.045 | 0.030 |

In summary, in the embodiments of the disclosure, one or more light conversion patterns disposed near the backlight module convert a portion of blue light into yellow light, and the unconverted blue light may be mixed with the yellow light to form white light, thereby addressing the problem of white light color point shift in the peripheral region and making white light performance in the main region and that in the peripheral region of the backlight module become consistent. In some embodiments, the width of the light conversion patterns near the peripheral region may be greater than the width of the light conversion patterns near the main region, such that the blue light near the peripheral region can be more converted into yellow light to address the problem of white light color point shift. In some embodiments, with the design of the alternately arranged light conversion patterns increasing the probability for a traveling light beam to contact the light conversion patterns, the probability for blue light to be converted into yellow light may be increased to address the problem of white light color point shift. In some embodiments, the light conversion patterns designed to have gaps therebetween may improve the white light performance between two adjacent light emitting units and in front of the light emitting units, or may address the problem of uneven brightness of the backlight module 10. In some embodiments, chromatic aberration may be addressed by designing the cross-sectional shape of the light conversion pattern.

The above embodiments are only used to illustrate technical solutions of the disclosure and are not intended to limit the disclosure. Although the disclosure has been described in detail with reference to the above embodiments, people of ordinary skill in the art should understand that they may still modify the technical solutions described in the above embodiments, or replace some or all of the technical features therein with equivalents, and such modifications or replacements of corresponding technical solutions do not substantially deviate from the scope of the technical solutions of the embodiments of the disclosure.

Although the disclosure has been disclosed in the above embodiments, the embodiments are not intended to limit the disclosure. People skilled in the art may make some changes, replacements, and modifications without departing from the spirit and the scope of the disclosure, and the features between the embodiments may be arbitrarily mixed and matched to form other new embodiments. Moreover, the scope of the disclosure is limited to the processes, machines, manufacture, compositions of matter, means, methods, or steps of the particular embodiments described in the specification. People of ordinary skill in the art may understand the processes, machines, manufacture, compositions of matter, means, methods, or steps, presently existing or later to be developed from the disclosure. Those performing substantially the same function or achieving substantially the same result as the corresponding embodiments described herein may be utilized according to the disclosure. Therefore, the appended claims of the disclosure include the above processes, machines, manufacture, compositions of matter, means, methods, or steps. In addition, each claim constitutes a separate embodiment, and the scope of the disclosure also includes a combination of each claim and embodiment. The scope of the disclosure is subject to the definition of the scope of the appended claims.

What is claimed is:

1. A light emitting device, comprising:
    a backing plate;
    a plurality of light emitting units disposed on the backing plate; and
    a layer disposed on the backing plate and having a first optical pattern and a second optical pattern;
    wherein, in a top view of the light emitting device, the layer has a first edge and a second edge opposite to the first edge, the first edge is closer to the first optical pattern and the second optical pattern than the second edge, the first optical pattern is closer to the first edge than the second optical pattern, and the first optical pattern is greater than the second optical pattern in size.

2. The light emitting device according to claim 1, wherein a width of the first optical pattern is greater than a width of the second optical pattern in a direction perpendicular to an extension direction of the first edge.

3. The light emitting device according to claim 2, wherein the direction is parallel to a side of the backing plate.

4. The light emitting device according to claim 3, wherein the direction is parallel to a long side of the backing plate.

5. The light emitting device according to claim 3, wherein the direction is parallel to a short side of the backing plate.

6. The light emitting device according to claim 1, wherein the first optical pattern and the second optical pattern are passed through by a reference line, and an extension direction of the reference line is perpendicular to an extension direction of the first edge.

7. The light emitting device according to claim 6, wherein the layer further has a third optical pattern passed through by the reference line, and the third optical pattern is located between the first optical pattern and the second optical pattern.

8. The light emitting device according to claim 7, wherein along the extension direction of the reference line, a width of the third optical pattern is less than a width of the first optical pattern and greater than a width of the second optical pattern.

9. The light emitting device according to claim 7, wherein a size of the third optical pattern is less than the size of the first optical pattern and greater than the size of the second optical pattern.

10. The light emitting device according to claim 1, wherein the first optical pattern and the second optical pattern are within a peripheral region of the light emitting device.

11. The light emitting device according to claim 1, wherein the first optical pattern and the second optical pattern are passed through by a reference line, the first optical pattern is closest to the first edge, and the first optical pattern is separated from the first edge with a gap.

12. The light emitting device according to claim 11, wherein the layer further has a third optical pattern passed through by the reference line, and the third optical pattern is located between the first optical pattern and the second optical pattern.

13. The light emitting device according to claim 12, wherein along an extension direction of the reference line, a width of the third optical pattern is less than a width of the first optical pattern and greater than a width of the second optical pattern.

14. The light emitting device according to claim 12, wherein a size of the third optical pattern is less than the size of the first optical pattern and greater than the size of the second optical pattern.

* * * * *